(12) United States Patent
Lundblad et al.

(10) Patent No.: US 6,871,859 B2
(45) Date of Patent: Mar. 29, 2005

(54) TOOLHOLDER AND INSERT ARRANGEMENT WITH A SHRINK FIT COUPLING

(75) Inventors: Mikael Lundblad, Gävle (SE); Sven Engstrand, Sandviken (SE)

(73) Assignee: Sandvik Aktiebolag, Sandviken (SE)

( * ) Notice: Subject to any disclaimer, the term of this patent is extended or adjusted under 35 U.S.C. 154(b) by 246 days.

(21) Appl. No.: 10/168,375

(22) PCT Filed: Dec. 14, 2000

(86) PCT No.: PCT/SE00/02530

§ 371 (c)(1),
(2), (4) Date: Aug. 26, 2002

(87) PCT Pub. No.: WO01/45883

PCT Pub. Date: Jun. 28, 2001

(65) Prior Publication Data

US 2003/0075879 A1 Apr. 24, 2003

(30) Foreign Application Priority Data

Dec. 22, 1999 (SE) .............................. 9904752

(51) Int. Cl.$^7$ .............................................. B23B 31/02
(52) U.S. Cl. ....................... 279/102; 279/103; 408/226; 408/239 R; 409/234
(58) Field of Search ................................ 279/4.03, 102, 279/103; 408/226, 238, 239 R, 239 A; 409/234, 232

(56) References Cited

U.S. PATENT DOCUMENTS

| | | | |
|---|---|---|---|
| 4,293,253 A | 10/1981 | Ott | |
| 4,387,906 A | 6/1983 | Nicolin | |
| 5,140,739 A | 8/1992 | Yamaguchi et al. | |
| 5,150,636 A | * 9/1992 | Hill | ............................ 76/108.2 |
| 5,280,671 A | 1/1994 | Marquart | |
| 5,311,654 A | 5/1994 | Cook | |
| 5,468,102 A | * 11/1995 | Stojanovski | ................ 409/234 |
| 5,582,494 A | 12/1996 | Cook | |
| 5,971,670 A | 10/1999 | Pantzar et al. | |
| 5,979,912 A | * 11/1999 | Cook | .......................... 279/102 |
| 6,234,729 B1 | * 5/2001 | Cook | .......................... 408/226 |
| 6,244,780 B1 | 6/2001 | Hansson | |
| 6,315,506 B1 | * 11/2001 | Mizoguchi | .................. 409/234 |

FOREIGN PATENT DOCUMENTS

| | | |
|---|---|---|
| CH | 53632 | * 10/1910 |
| DE | 196 38 808 | 3/1998 |
| DE | 198 44 018 | 3/2000 |
| JP | WO-99/07504 | * 2/2000 |
| WO | WO 94/26448 | 11/1994 |

\* cited by examiner

*Primary Examiner*—Daniel W. Howell
(74) *Attorney, Agent, or Firm*—Burns, Doane, Swecker & Mathis, L.L.P.

(57) ABSTRACT

A toolholder and insert arrangement includes an insert having a cutting portion and a shank portion disposed at a base of the cutting portion. The toolholder has a first end attachable to a spindle and a second end having a shank-receiving opening. When the toolholder is at ordinary room temperature, the shank-receiving opening is smaller than the shank portion. Upon heating of the toolholder to a predetermined temperature above the ordinary room temperature and above an ordinary operating temperature, the shank-receiving opening expands to become at least as large as the shank portion. Upon cooling of the toolholder to a temperature below the predetermined temperature and after insertion of the shank portion in the shank-receiving opening, the shank-receiving opening shrinks to generally conform to a shape of the shank portion.

22 Claims, 16 Drawing Sheets

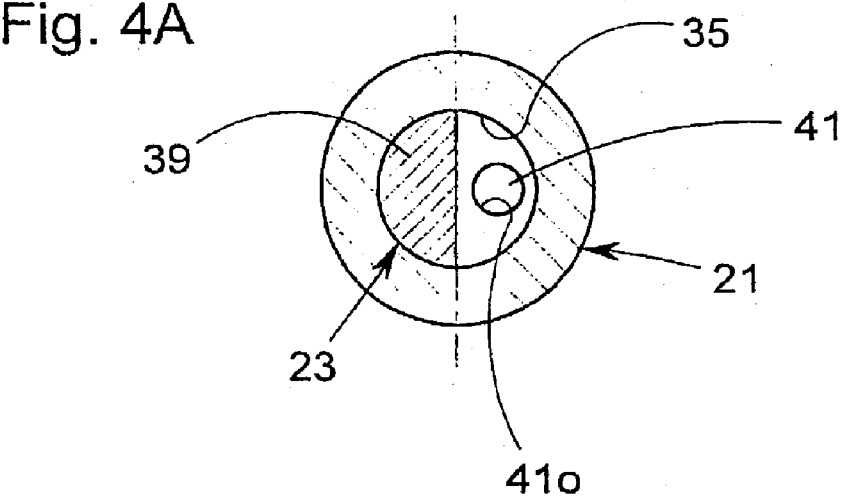
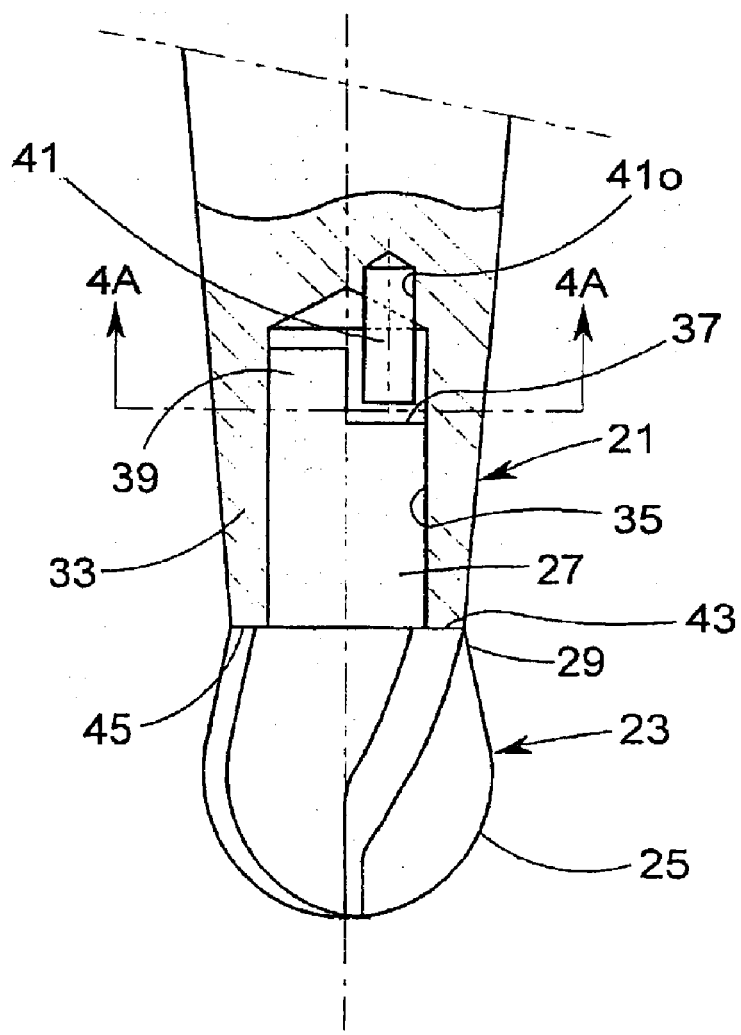

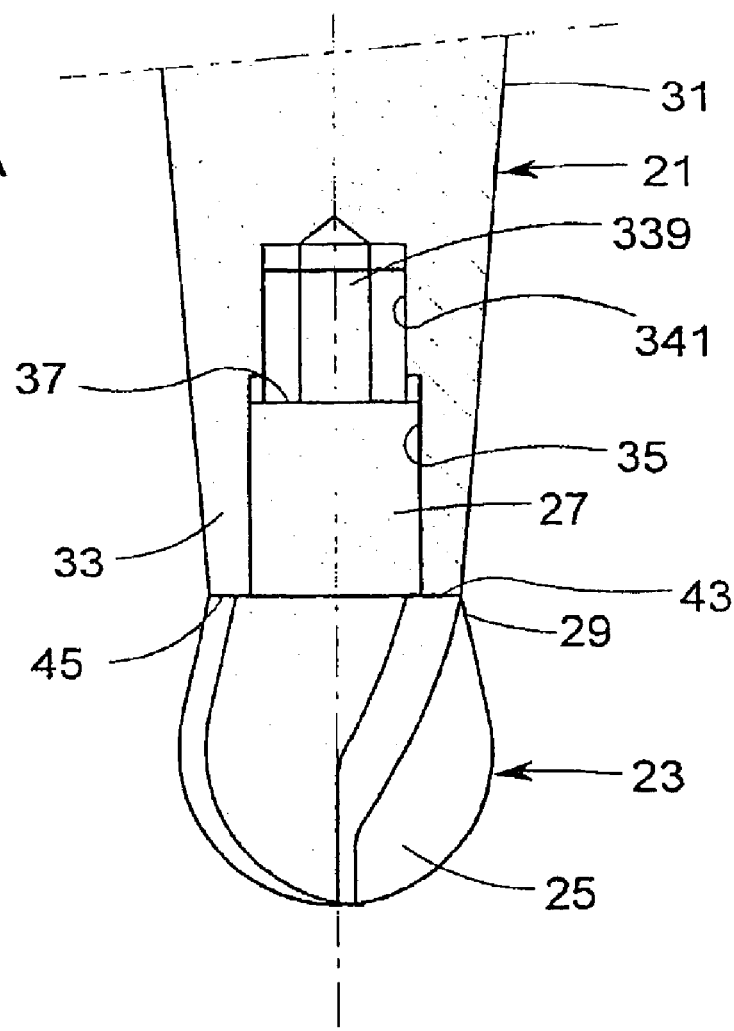
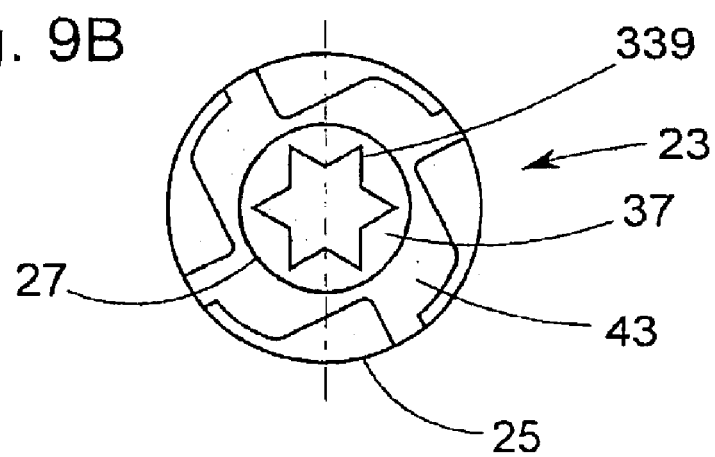

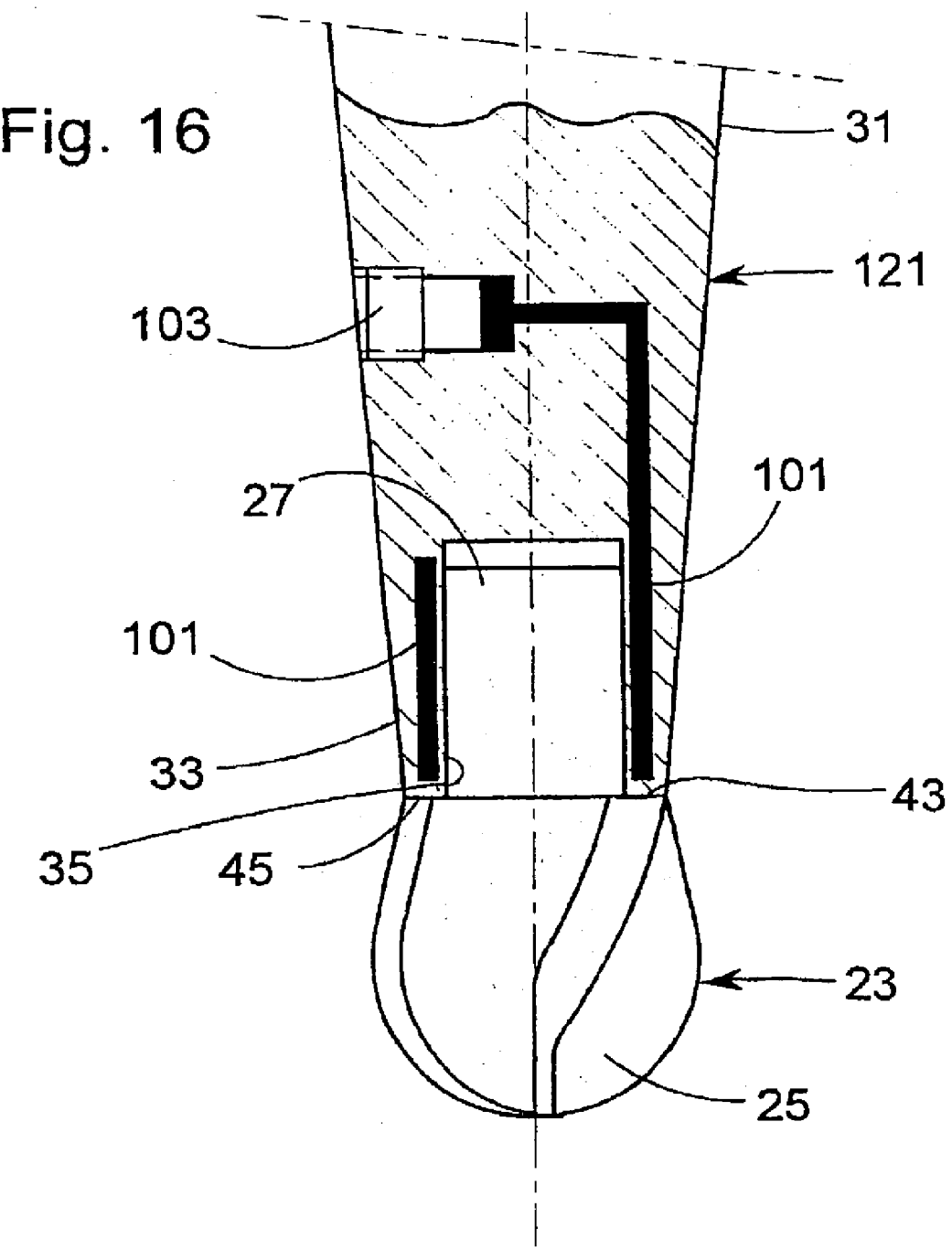

TOOLHOLDER AND INSERT ARRANGEMENT WITH A SHRINK FIT COUPLING

BACKGROUND AND SUMMARY

The present invention relates to a toolholder and insert arrangement and, more particularly, to a toolholder and insert arrangement wherein an insert is coupled to a toolholder by a shrink fit coupling.

The use of toolholders with replaceable cutting inserts is well known. Examples of tool arrangements in which toolholders with replaceable cutting insert are used include drilling, milling, turning, and grinding operations. Tools such as ball-nose end mills, drills, and grinding wheels can include cutting inserts having shanks made of extremely hard material, such as cemented carbide, while the toolholder is made of a more easily machinable material, such as tool steel. The hard inserts tend to last longer than similar one-piece tools which must be made of a material suitable for machining. Moreover, because the inserts are replaceable, the toolholder will typically be used for extended periods of time without replacement, even though inserts are replaced periodically.

The inserts are typically secured to the toolholder using some form of mechanical connection, such as a screw through the insert, or a set screw or other clamping arrangement. U.S. Pat. No. 4,293,253 and WO 96/06702 disclose toolholders and inserts having a mechanical connection wherein an insert is screwed into a toolholder. A drawback to such conventional toolholder and insert arrangements is that the mechanical connection may fail and damage the toolholder or the insert, or both. Moreover, when a mechanical connection component fails, unless a stock of mechanical connection components is maintained in addition to a stock of toolholders and inserts, the tool must be shut down until a new connection component can be obtained. This can result in undesired expense and loss of productivity. Further still, the mechanical connection components often require specialized tools for connecting the cutting inserts to the toolholders. It is desirable to provide a toolholder and insert arrangement that avoids the need for separate mechanical connection components to secure the insert relative to the toolholder, and that avoids the need for specialized tools for securing the insert relative to the toolholder.

In accordance with an aspect of the present invention, a toolholder and insert arrangement includes an insert having a cutting portion and a shank portion at a base of the cutting portion, and a toolholder having a first end attachable to a spindle and a second end having a shank-receiving opening. When the shank portion is not disposed in the shank receiving opening and the toolholder is at an ordinary room temperature, the shank-receiving opening is smaller than the shank portion, and upon heating of the toolholder to a predetermined temperature above the ordinary room temperature and above an ordinary operating temperature the shank-receiving opening expands to become at least as large as the shank portion and, upon cooling of the toolholder to a temperature below the predetermined temperature and after insertion of the shank portion in the shank-receiving opening, the shank-receiving opening shrinks to generally conform to a shape of the shank portion.

BRIEF DESCRIPTION OF THE DRAWINGS

The features and advantages of the present invention are well understood by reading the following detailed description in conjunction with the drawings in which like numerals indicate similar elements and in which:

FIGS. 4A and 4B are bottom and side cross-sectional views of a toolholder and insert arrangement according to an embodiment of the present invention;

FIG. 9A is a side cross-sectional view of a toolholder and insert arrangement according to an embodiment of the present invention and FIG. 9B is a top view of the insert of FIG. 9A;

FIG. 16 is a side, cross-sectional view of a toolholder and insert arrangement according to an embodiment of the present invention.

DETAILED DESCRIPTION

Figure 1:
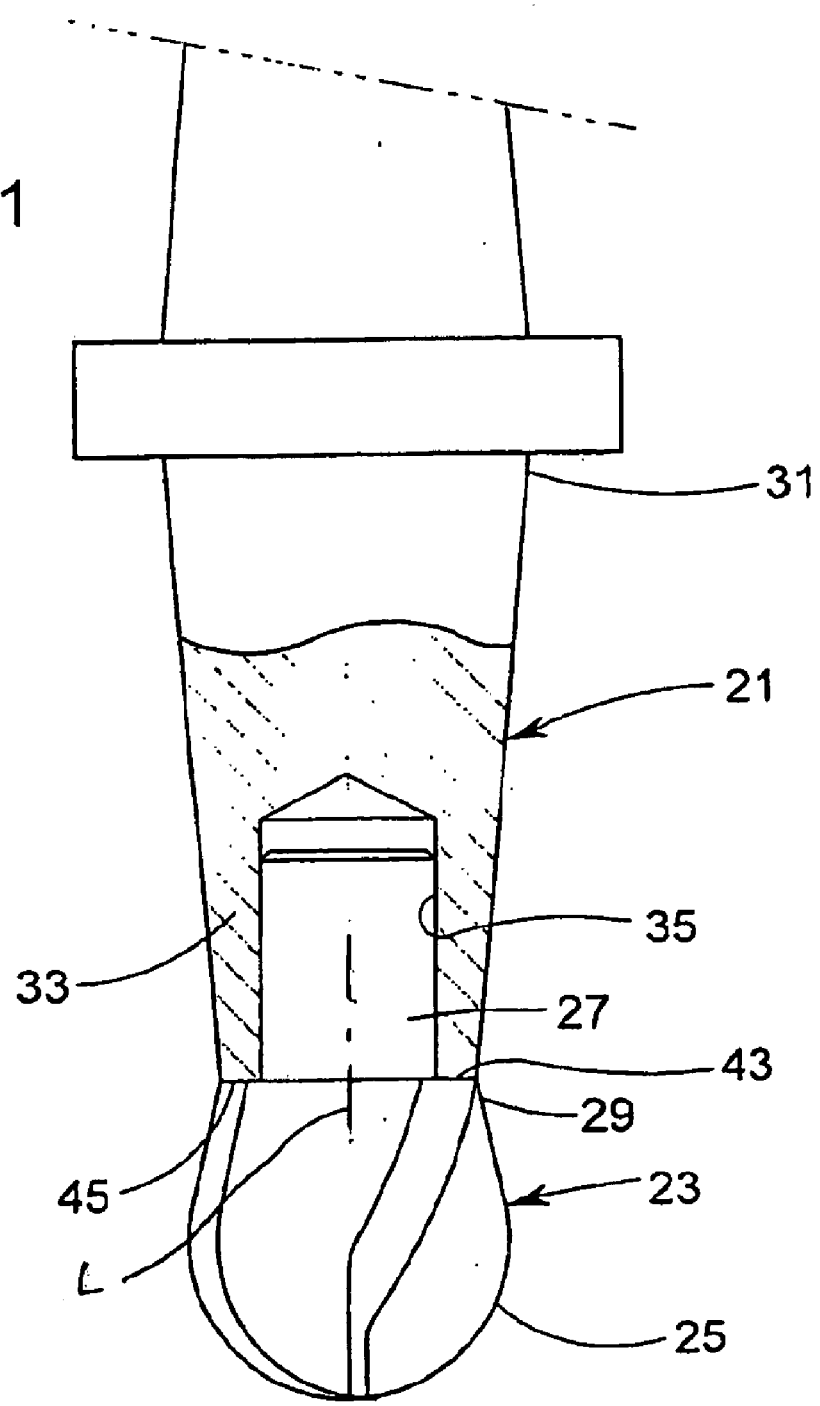
FIG. 1 is a partially cross-sectional view of a toolholder and insert arrangement according to an embodiment of the present invention.
Figure 2:
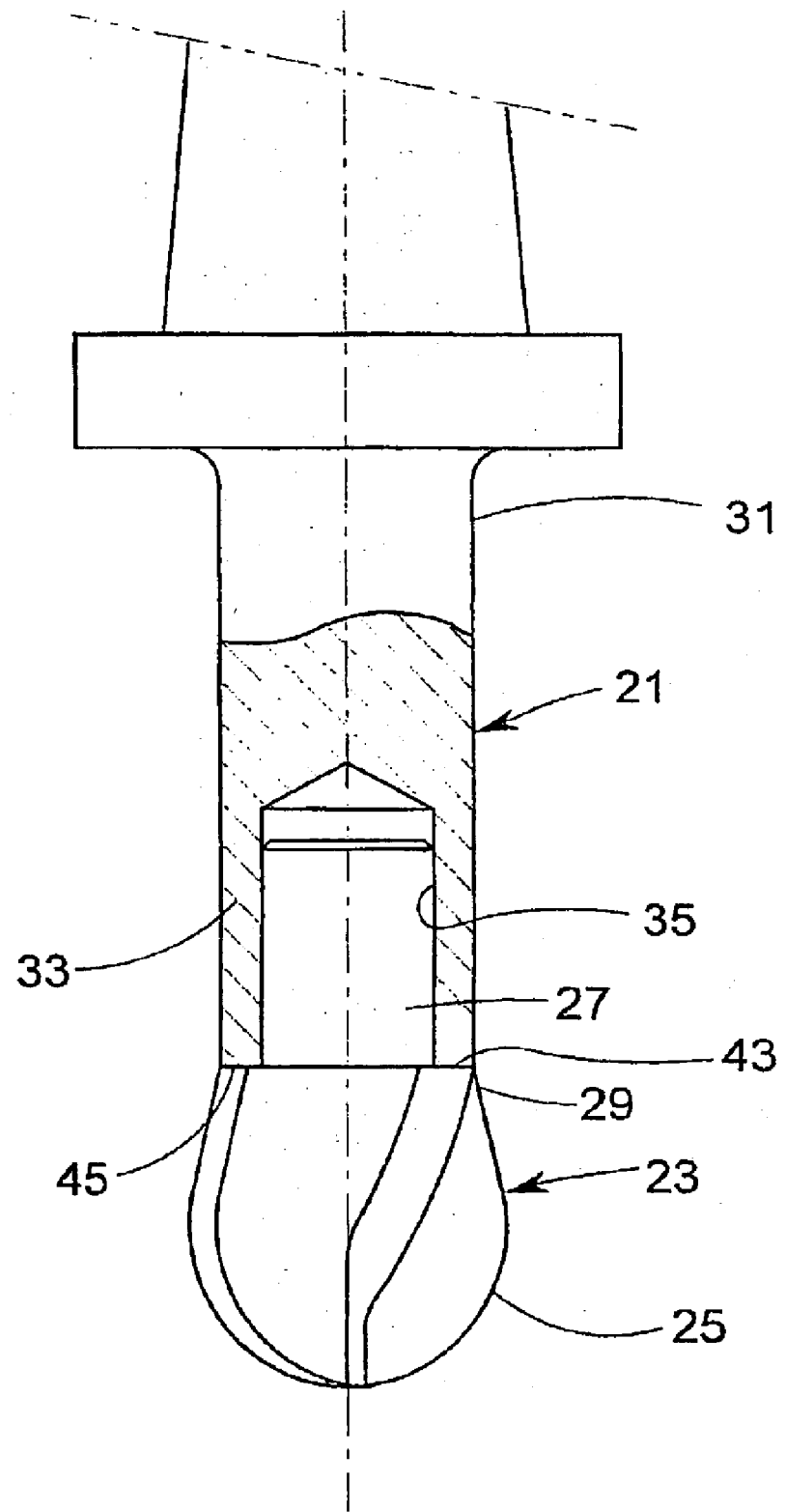
FIG. 2 is a partially cross-sectional view of a toolholder and an insert arrangement according to another embodiment of the present invention.

Embodiments of a toolholder 21 and insert 23 according to an embodiment of the present invention are shown in cross-section in FIGS. 1 and 2, showing a substantially truncated conical toolholder and a substantially circularly cylindrical toolholder, respectively. The precise external shape of the toolholder 21 can, of course, be any suitable shape and is not limited to truncated conical or circularly cylindrical shapes. The insert 23 includes a cutting portion 25 and a shank portion 27 at a rear base 29 of the cutting portion. The insert defines a longitudinal center axis L. According to a presently preferred embodiment of the present invention, the cutting portion 25 of the insert 23 is a ball-nose end mill portion but, if desired or necessary, may be any other desired rotating tool, such as a drill, a grinder, or the like.

The toolholder 21 preferably has a first end 31 attachable to a conventional spindle and a second end 33 having a shank-receiving opening 35. When the shank portion 27 is not disposed in the shank receiving opening 35 and the toolholder 21 is at an ordinary room temperature, the shank-receiving opening is smaller than the shank portion. Upon heating of the toolholder 21, or at least a portion thereof, to a predetermined temperature above the ordinary room temperature and above an ordinary operating temperature of the toolholder, the shank-receiving opening 35 expands to become at least as large as the shank portion 27 and permits insertion of the shank portion into the shank-receiving opening or removal of the shank portion from the shank-receiving opening.

Upon cooling of the toolholder 21 to a temperature below the predetermined temperature and after insertion of the shank portion 27 in the shank-receiving opening 35, the shank-receiving opening shrinks to generally conform to a shape of the shank portion. Preferably, an internal diameter ID of the shank-receiving opening 35 relative to an external diameter OD of the shank portion 27 is selected such that the internal diameter of the shank-receiving opening is smaller than the external diameter of the shank portion when the toolholder is at the ordinary room temperature and no shank is received in the shank-receiving opening, and the internal diameter of the shank-receiving open is smaller than the external diameter of the shank portion when the toolholder is at the ordinary operating temperature and no shank portion is disposed in the shank-receiving opening. It is presently believed that a predetermined temperature to which a toolholder 21 made of, for example, tool steel, might be heated should be approximately 300° C., possibly between 250° C. and 350° C., assuming that the ordinary room temperature of the shank 27 is approximately 20° C.

Preferably, the internal diameter ID of the shank-receiving opening 35, when the toolholder 21 is at the ordinary room temperature, relative to an external diameter OD of the shank portion 27 is selected such that, when the shank portion is received in the shank-receiving opening and the shank-receiving opening has shrunk to generally conform to the shape of the shank portion and is at or below the ordinary operating temperature, the toolholder applies sufficient force to the shank to resist ordinary operating torsional forces T and turning moments M on the shank. Typically, even though a relatively smaller diameter toolholder 21 will expand, in terms of percent expansion, approximately the same as a relatively larger diameter toolholder made of a material having the same coefficient of thermal expansion as the smaller toolholder when both toolholders are heated the same amount, because there is less material to expand in the smaller toolholder, the smaller toolholder will expand a lesser total amount than the larger toolholder. As a result, the smaller toolholder will likely not be able to grip a shank portion 27 with as much force as a larger toolholder when it contracts after heating.

However, because smaller tools typically are intended for applications requiring lower levels of power than larger toolholders, this should not ordinarily be a problem. If desired or necessary, of course, additional known mechanical couplings, such as hydraulic couplings, compression couplings, set screws, pins and pin-receiving openings, and the like, can be added to the toolholder 21 and/or the shank 27 if it is necessary to hold a shank in a shank-receiving opening 35 of a toolholder with greater force than can be achieved through the shrink-fit coupling of the present invention.

In a toolholder 21 and insert 23 arrangement according to the present invention, where:

$D_y$ is the outside diameter of the toolholder;

d is the nominal diameter of the shrink fit (i.e., the diameter without tolerances);

$d/D_y = x_y$ = ratio of diameters (nominal diameter to the outside diameter of the toolholder);

G is the grip (the difference between the shank OD and the toolholder ID);

$E_y$ is the modulus of elasticity of the toolholder;

$E_i$ is the modulus of elasticity of the shank;

$m_y$ is Poisson's ratio for the toolholder; and $m_i$ is Poisson's ratio for the shank, it is presently understood that the pressure on the shank when fitted in the shank-receiving opening of the toolholder can be represented by the following equation:

$$p = \frac{G}{d} \frac{1}{\frac{1}{E_y}\left(\frac{1+x_y^2}{1-x_y^2} + \frac{1}{m_y}\right) + \left(\frac{1}{E_i}\right)\left(1 - \frac{1}{m_i}\right)}$$

The maximum turning moment $M_v$ that can be borne by the toolholder and insert arrangement before slipping is understood to be represented by the equation:

$$M_v = p\pi d l C_f d/2$$

where:

$C_f$ is the coefficient of friction between the shank and the shank-receiving opening of the toolholder; and l is the inserted shank length.

Using the foregoing equations, when the properties of the materials to be used for the toolholder and the shank are known, it is possible to appropriately size the toolholder and the shank for use in particular operating conditions.

FIGS. 3A–11B show another preferred mechanical structure for facilitating transfer of additional torque beyond that which is obtained solely from the shrink-fit coupling between the toolholder 21 and the insert 23. The embodiment shown in, for example, FIGS. 3A–3B involves providing a rear end 37 of the shank portion 27 remote from the cutting portion 25 with a longitudinally extending engagement portion 39 and providing the shank-receiving opening 35, as seen in FIGS. 4A and 4B, with a corresponding engagement portion 41 in which the engagement portion 39 is received. The engagement portion 39 and the corresponding engagement portion 41 are preferably in the shape of portions that can transmit rotational torque from the toolholder 21 to the shank portion 27, such as non-circular portions and offset pins and pin-receiving openings.

It will be appreciated that a variety of shapes can be provided to achieve the object of preventing rotation of the shank portion 27 relative to the shank-receiving opening. Indeed, although the entire shank 27 and the shank-receiving opening 35 are illustrated in all of the embodiments as being circular, they could be specially shaped in, for example, a non-circular shape for engagement of the entire shank with the opening in the toolholder 21. However, it is presently believed that excessive deviation from generally circular shapes is undesirable, primarily because such deviation could make machining of components more difficult than necessary, and because different portions of a toolholder may not expand the same amounts as other portions when heated, which may result in difficulty in fitting the shank of the insert 23 into the shank-receiving opening 35.

Figure 3A:
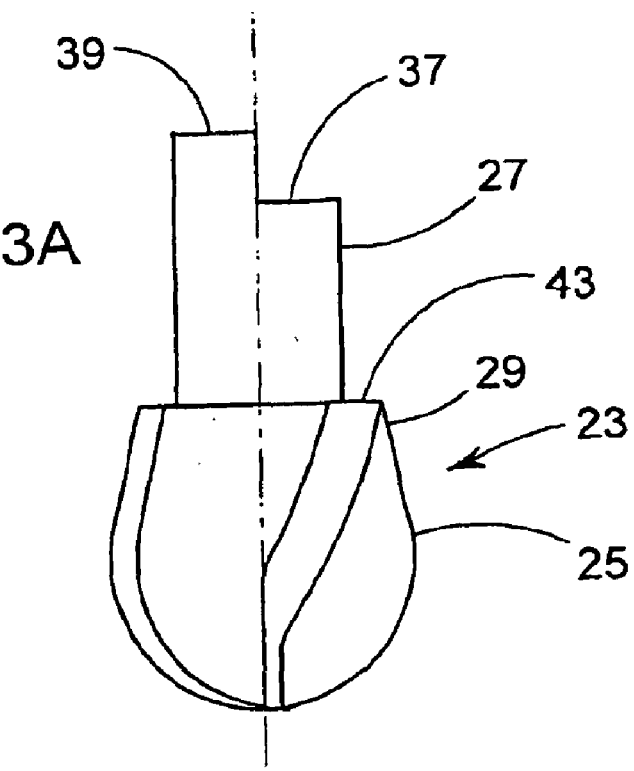
FIGS. 3A and 3B are side and top views of an insert for a toolholder and an insert arrangement according to an embodiment of the present invention.
Figure 3B:
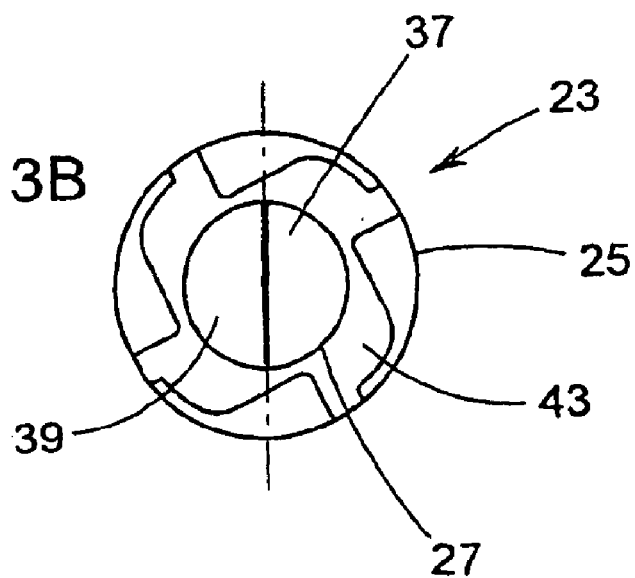

The engagement portion 39 of the shank portion 27 preferably includes a half-circle shape as seen in FIGS. 3A and 3B. The half-circle shape of the engagement portion 39 permits transmission of rotational forces from the corresponding engagement portion 41 (FIGS. 4A–4B) as a leading portion of the corresponding engagement portion rotates and contacts a rearward portion of the engagement portion of the shank 27. The half-circle shape of the engagement portion 39 offers the advantage of a simple method of manufacture.

A half-circle-shape of a corresponding engagement portion can be formed by machining or, for example, by attachment of a half-circular shape inside of the shank-receiving opening, such as by brazing, soldering, welding, mechanical fastening, adhesives, or the like. Thus, the engagement portion is an integrated part of the toolholder. Instead of machining or brazing in a half-circle-shaped corresponding engagement portion, a pin 41, as shown in FIGS. 4A and 4B, may be used. The pin 41 is preferably fitted into a pin-receiving opening 410 formed in a bottom wall of the shank-receiving opening 35. In operation, when forces on the cutting portion 25 exceed the force with which the shrink fit coupling between the shank 27 and the toolholder 21 and cause the shank 27 to turn relative to the toolholder, the pin 41 contacts the flat wall of the half-circle of the engagement portion 39 and permits transmission of additional torque.

Figure 5A:
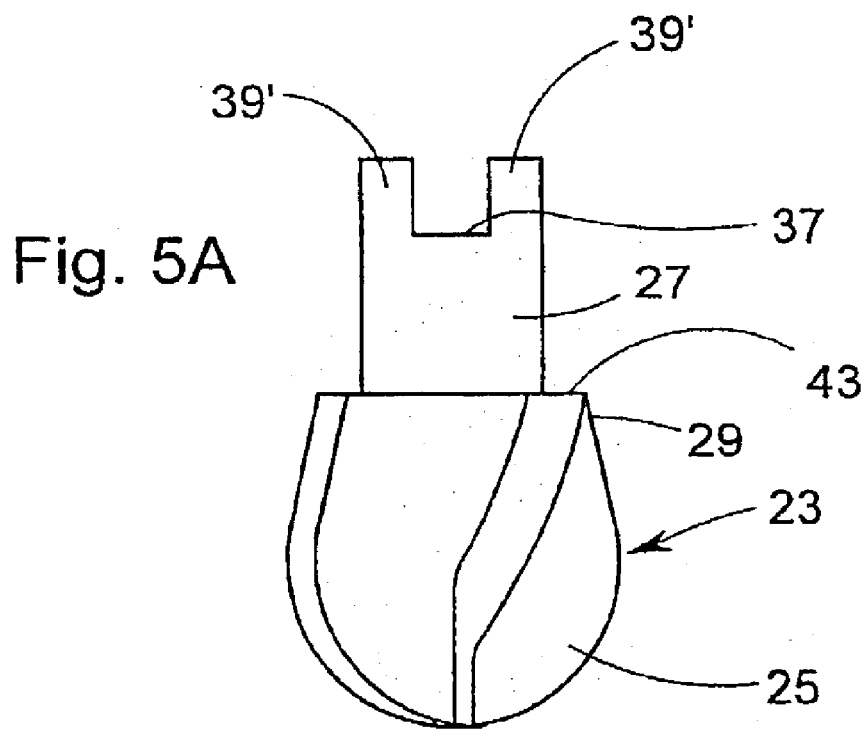
FIGS. 5A and 5B are side and top views of an insert for a toolholder and insert arrangement according to an embodiment of the present invention.
Figure 5B:
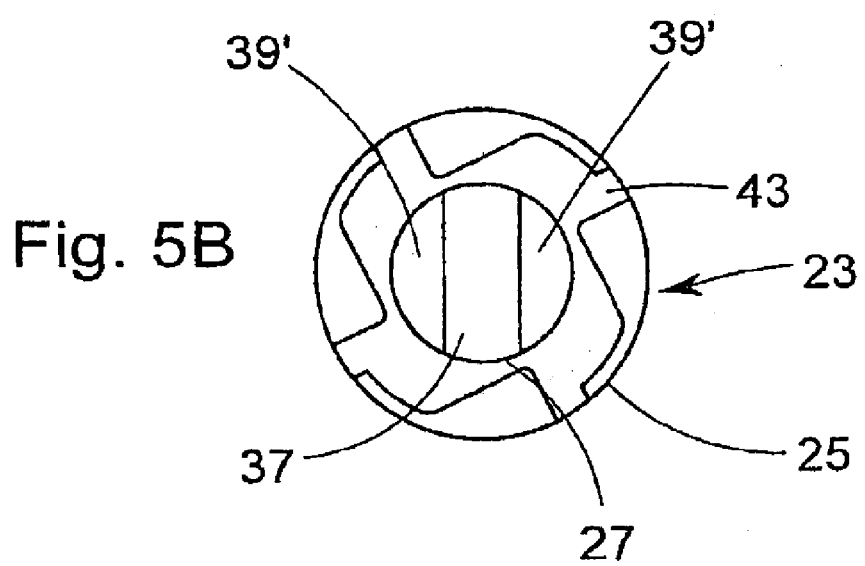
Figure 6A:
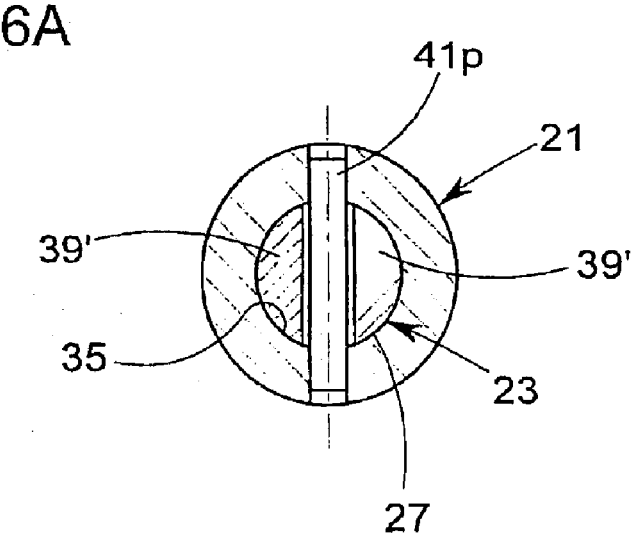
FIGS. 6A and 6B are bottom and side cross-sectional views of a toolholder and insert arrangement according to an embodiment of the present invention.
Figure 6B:
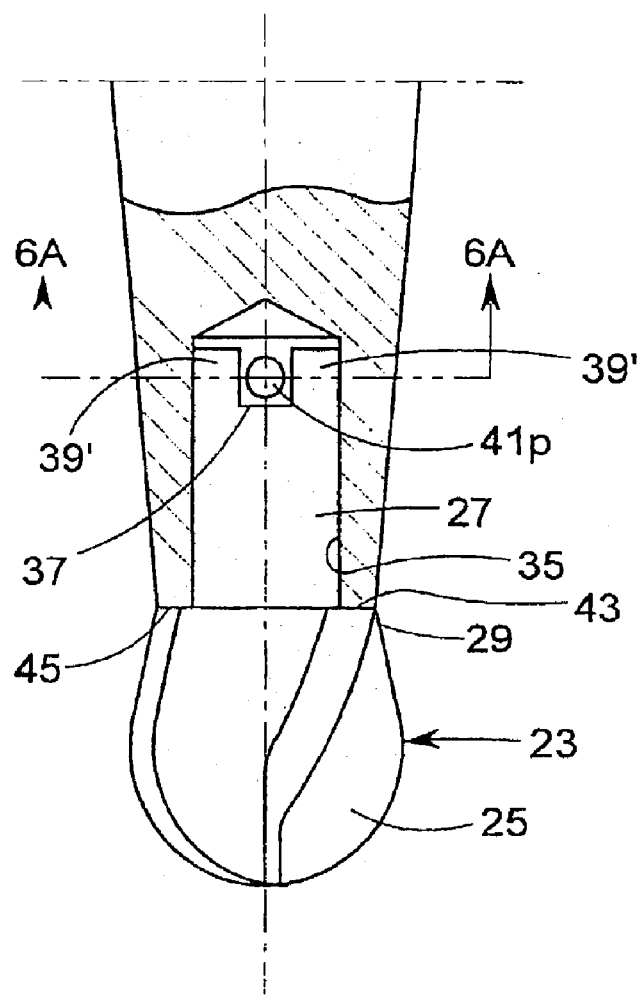
Figure 7A:
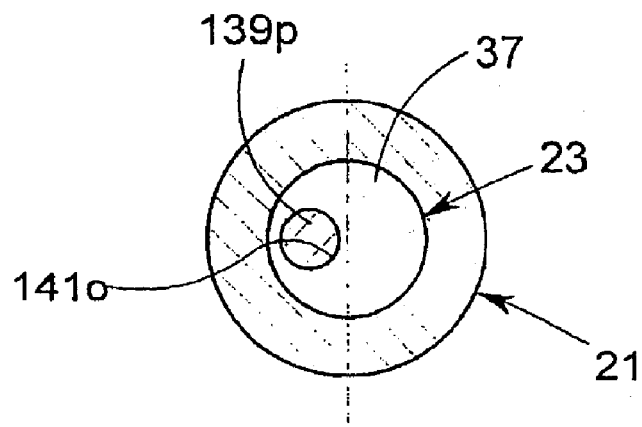
FIGS. 7A and 7B are bottom and side cross-sectional views of a toolholder and insert arrangement according to an embodiment of the present invention.
Figure 7B:
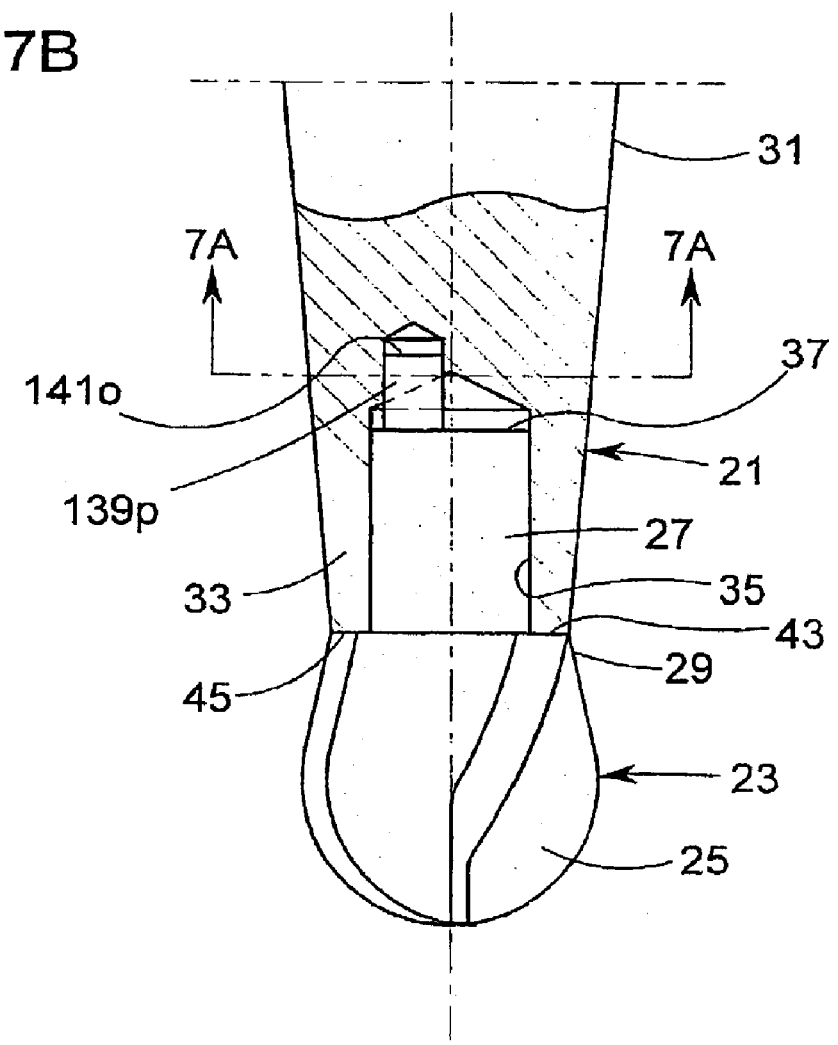

As seen in FIGS. 5A and 5B, another embodiment of the engagement portion 39' may include one or more, preferably two, semicircles. The corresponding engagement portion is preferably shaped to mate with the semicircle or semicircles. As seen in FIGS. 6A and 6B, instead of having the shape of a portion of a circle, the corresponding engagement portion for use with the insert shown in FIGS. 5A–5B may be in the form of a pin 41p that extends substantially perpendicularly to the axis of the shank 27 and the shank-receiving opening 35 and adjacent a semi-circular portion or between two semi-circular portions that form a pin-receiving opening. If desired or necessary, a pin can, instead of extending perpendicularly to the axis of the shank 27 and the shank-receiving opening 35 as illustrated in FIGS. 6A and 6B, extend parallel to the axis of the shank and the shank-receiving opening, or even at some angle between parallel and perpendicular. A parallel, perpendicular, or angled pin may be fixed to or removable from the toolholder 21 and/or the shank 27, as desired or necessary, and more than one pin may be provided, as desired or necessary. A pin 139p that is an integrated part of the shank 27 and is received in a pin-receiving opening 141o in the toolholder 21 is shown in FIGS. 7A and 7B, wherein the pin 139p is off-center to facilitate transmission of torque.

It will be appreciated that engagement portions and corresponding engagement portions may, if desired or necessary, be reversed from the manner illustrated. For example, the corresponding engagement portion for use with the shank 27 illustrated in FIGS. 5A and 5B can be substituted for the engagement portion 39' on the shank 27, and the engagement portion can be substituted for the corresponding engagement portion in the shank-receiving opening 35 of the toolholder 21.

Figure 8A:
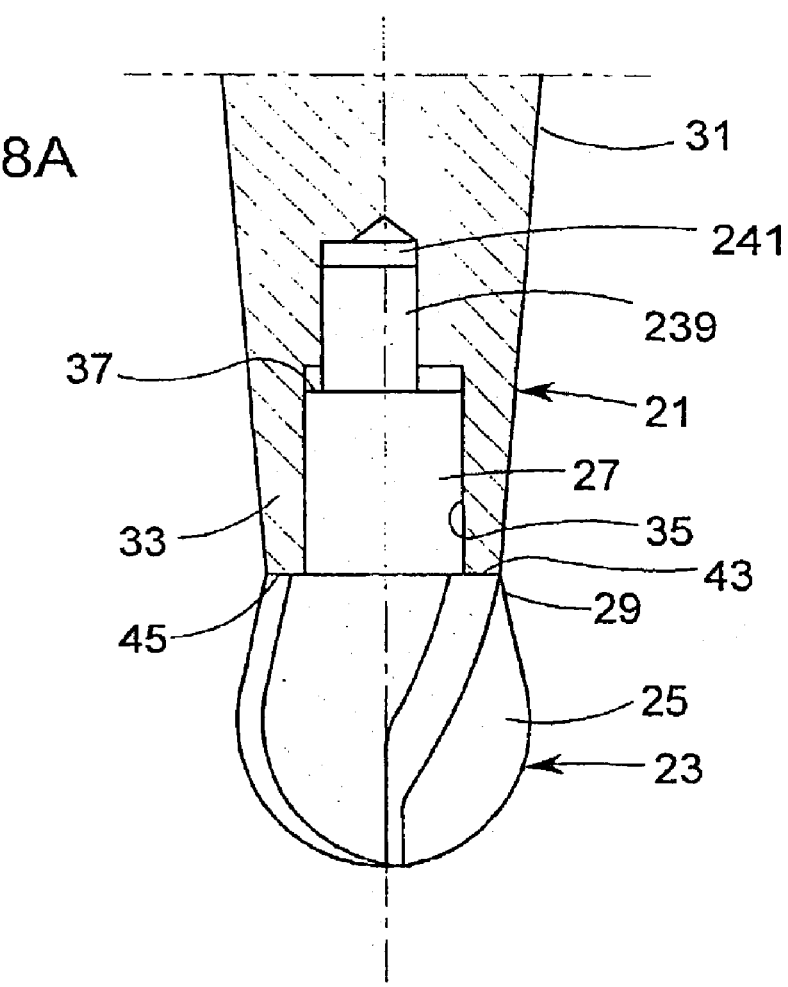
FIG. 8A is a side cross-sectional view of a toolholder and insert arrangement according to an embodiment of the present invention and FIG. 8B is a top view of the insert of FIG. 8A.
Figure 8B:
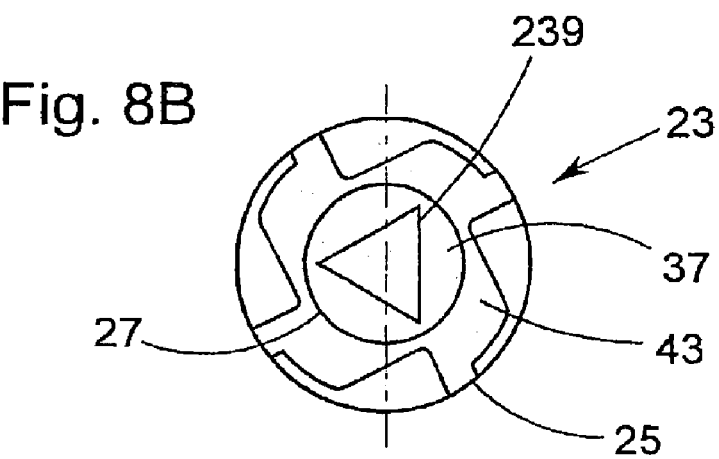
Figure 10A:
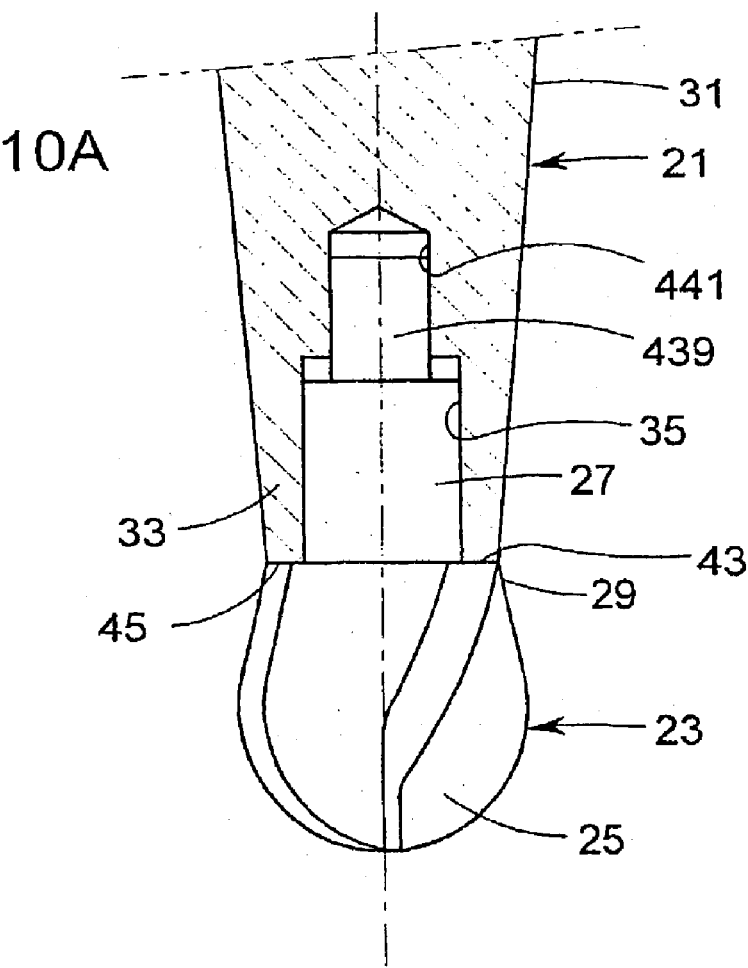
FIG. 10A is a side cross-sectional view of a toolholder and insert arrangement according to an embodiment of the present invention and FIG. 10B is a top view of the insert of FIG. 10A.
Figure 10B:
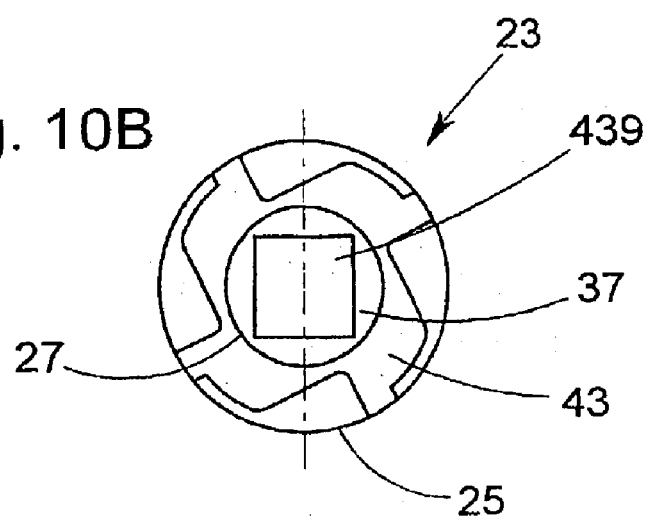
Figure 11A:
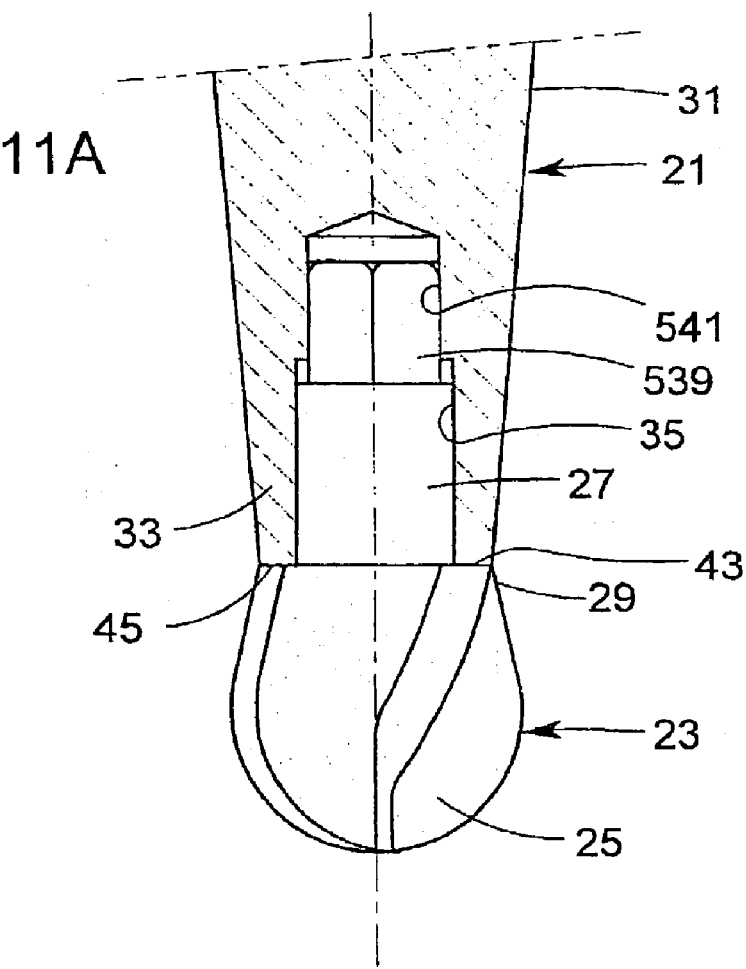
FIG. 11A is a side, cross-sectional view of a toolholder and insert arrangement according to an embodiment of the present invention
Figure 11B:
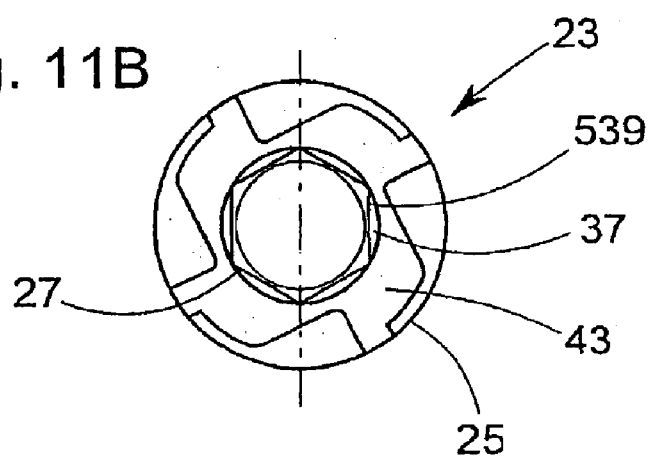
FIG. 11B is a top view of the insert of FIG. 11A.

FIGS. 8A–11B show further embodiments of the toolholder 21 and insert 23 arrangement wherein the shank 27 portion is provided with a non-circular engagement portion and the shank-receiving opening 35 is provided with a corresponding engagement portion illustrating several of the possible shapes of non-circular engagement portions. FIG. 8A shows a toolholder 21 and insert 23 arrangement, FIG. 8B showing the insert alone, wherein the shank 27 is provided with a triangular engagement portion 239 and a corresponding triangular engagement portion 241 provided in the shank-receiving opening. FIG. 9A shows a toolholder 21 and insert 23 arrangement, and FIG. 9B shows the insert alone, wherein the shank 27 is provided with a star-shaped engagement portion 339 and a corresponding star-shaped engagement portion 341 provided in the shank-receiving opening. FIG. 10A shows a toolholder 21 and insert 23 arrangement, and FIG. 10B shows the insert alone, wherein the shank 27 is provided with a square or rectangular engagement portion 439 and a corresponding square or rectangular engagement portion 441 provided in the shank-receiving opening. FIG. 11A shows a toolholder 21 and insert 23 arrangement, FIG. 11B showing the insert alone, wherein the shank 27 is provided with a hexagonal engagement portion 539 and a corresponding hexagonal engagement portion 241 provided in the shank-receiving opening. It will be appreciated that substantially any desired non-circular shape may be provided for the engagement portion and the corresponding engagement portion, as desired or necessary. The non-circular corresponding engagement portions in the embodiments disclosed herein may be provided by any suitable technique. For example, the non-circular corresponding engagement portions may be provided by brazing elements in the shank-receiving opening to form non-circular shapes, or by machining the shank-receiving opening.

As seen in all of the embodiments of FIGS. 1–7B, the cutting portion 25 is preferably larger in diameter than the shank portion 27 and the base 29 of the cutting portion proximate the shank portion includes a radial shoulder 43. Similarly, an end of the toolholder 21 preferably includes a radial shoulder 45 against which the radial shoulder 43 of the cutting portion 25 abuts. The radial shoulder 45 of the toolholder 21 and the radial shoulder 43 of the cutting portion 25 are preferably substantially the same size as each other. The shoulder 43 on the cutting portion 25 facilitates avoiding inserting the shank portion 27 too deeply within the shank-receiving opening 35. If desired or necessary, of course, the cutting portion 25 may have substantially the same diameter as the shank portion 27.

The toolholder 21 may be any suitable shape. As seen in FIG. 1, for example, the toolholder may be in the form of a truncated cone or, as seen in FIG. 2, the toolholder may substantially circularly cylindrical.

Figure 12A:
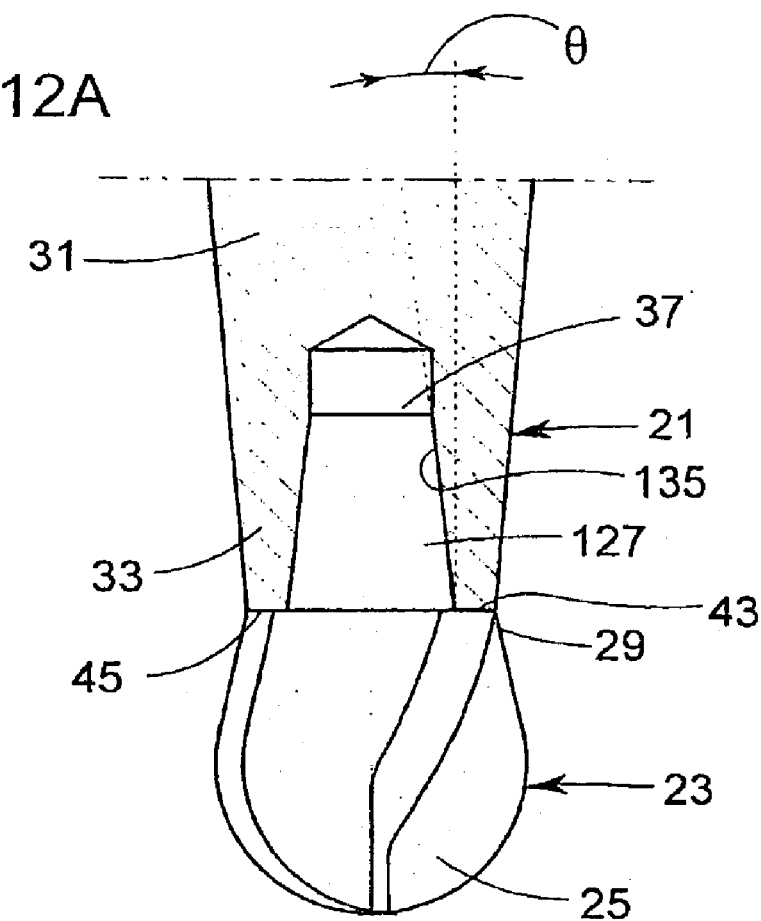
FIG. 12A is a side, cross-sectional view of a toolholder and insert arrangement according to an embodiment of the present invention
Figure 12B:
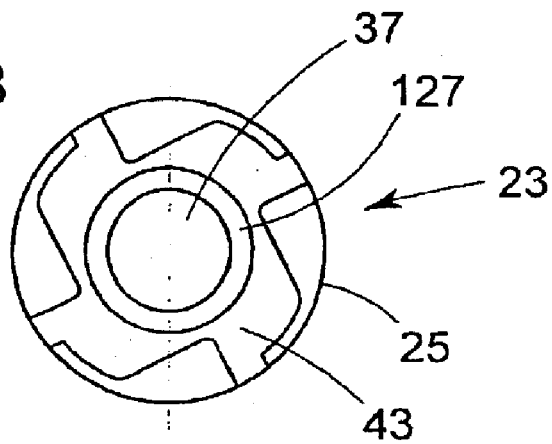
FIG. 12B is a top view of the insert of FIG. 12A.

As seen in FIGS. 1–11B, the shank portion 27 and the shank-receiving opening 35 are preferably substantially circularly cylindrical over at least a portion of their length. As seen in FIGS. 12A–12B, the shank portion 127 may have a truncated cone shape, and the shank-receiving opening 135 may have a shape corresponding to the shape of the shank portion. The truncated cone shape of the shank portion 127 facilitates insertion of the shank portion into the shank-receiving opening 135, even if the toolholder 21 is not fully heated. Preferably, an angle $\Theta$ that a side of the shank portion 127 forms with a perpendicular to the base of the shank portion at the base 29 of the cutting portion is less than 2°.

Figure 13A:
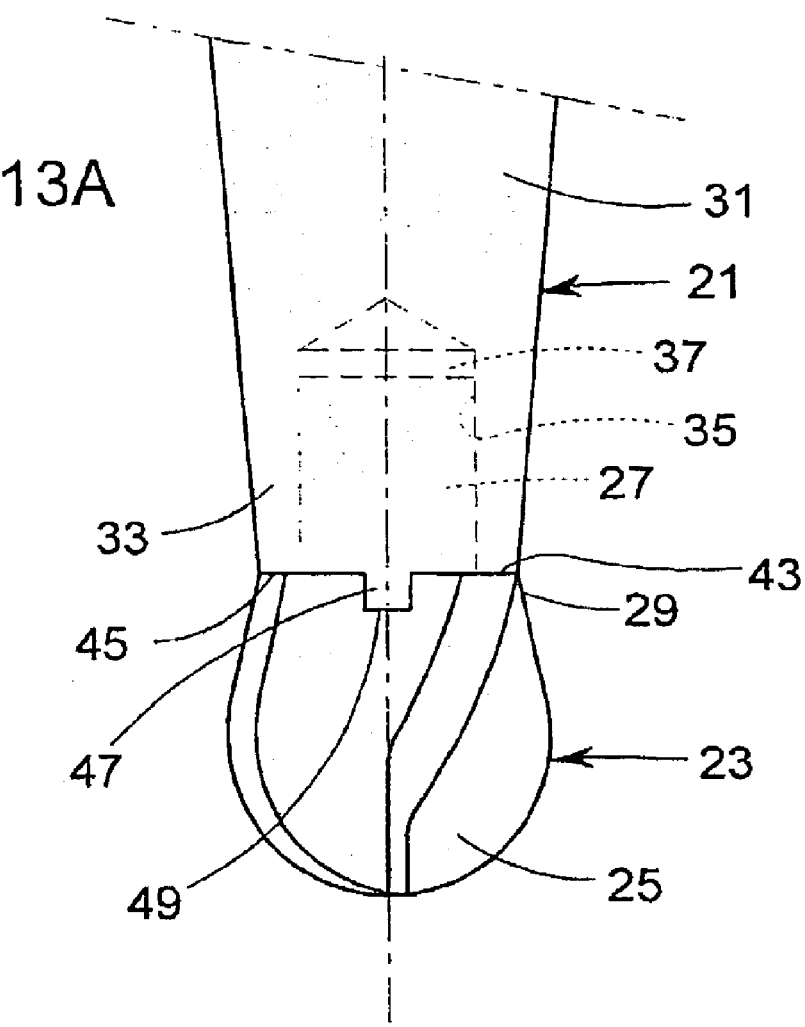
FIG. 13A is a side, cross-sectional view of a toolholder and insert arrangement according to an embodiment of the present invention
Figure 13B:
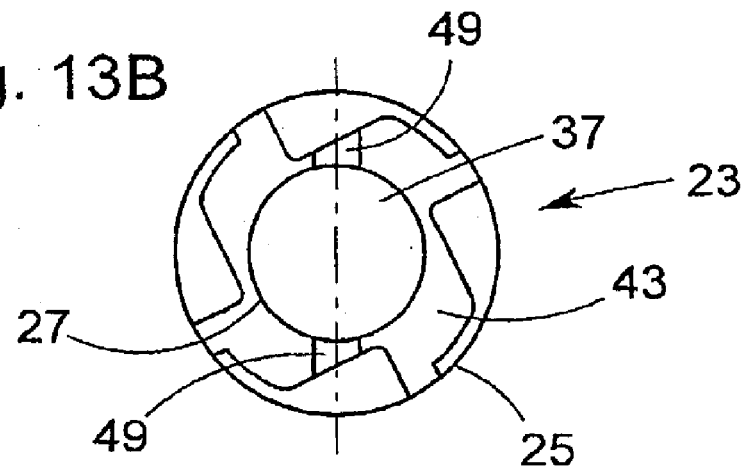
FIG. 13B is a top view of the insert of FIG. 13A.

As seen in FIG. 13A, which shows the toolholder 21 and insert 23, and FIG. 13B, which shows the insert alone, the radial shoulder 43 of the cutting portion 25 and the radial shoulder 45 of the toolholder 21 can be provided with interengaging members 47 and 49, respectively. The interengaging members 47 and 49 may be in the form of, for example, at least one ridge and at least one ridge receiving recess. If desired or necessary, a plurality of interengaging members, such as a toothed pattern, can be provided. The interengaging members 47 and 49 can assist in transmitting torque from the toolholder 21 to the cutting portion 25, and vice-versa.

Figure 14:
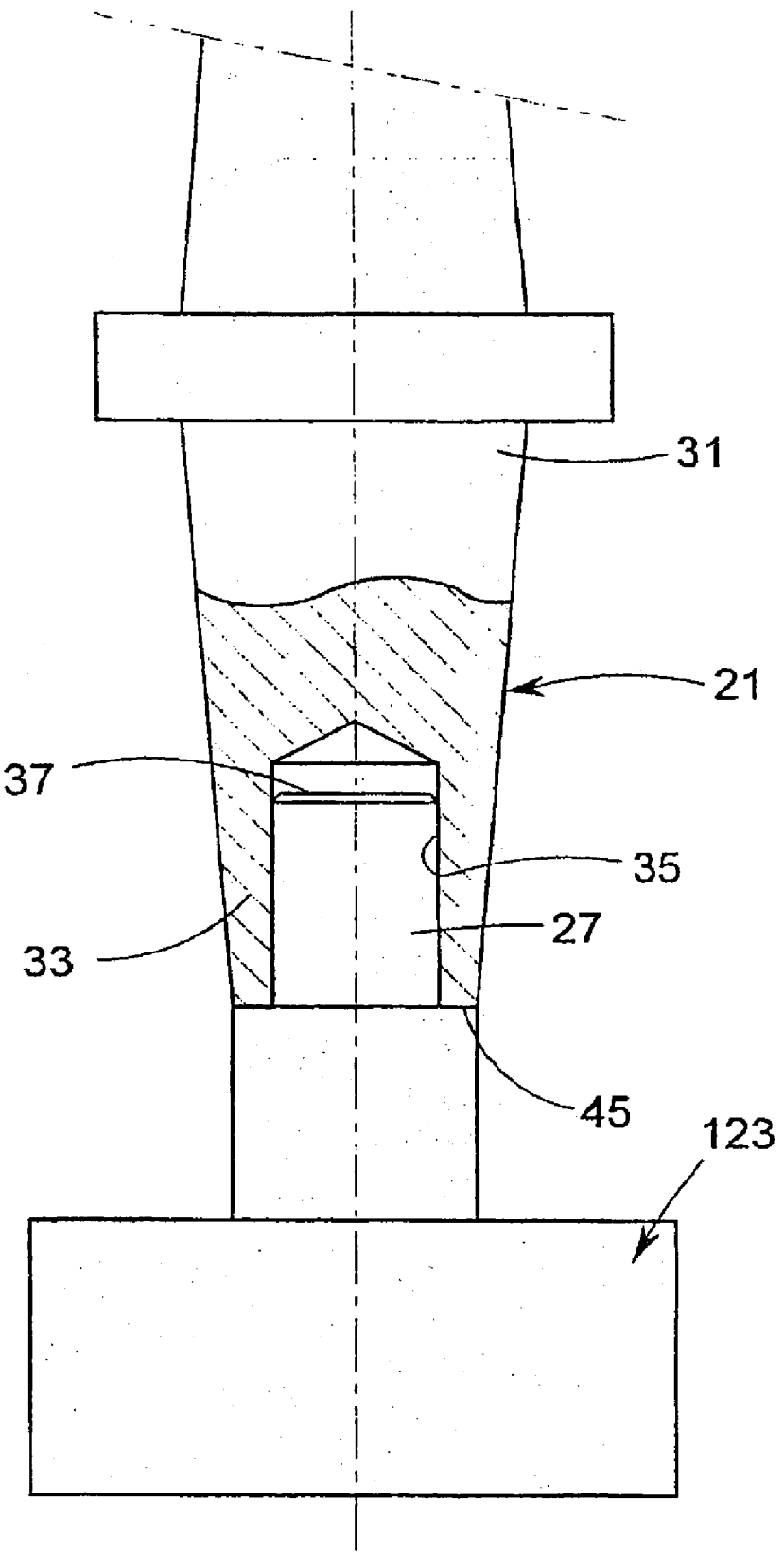
FIG. 14 is a side, cross-sectional view of a toolholder and insert arrangement according to an embodiment of the present invention.
Figure 15:
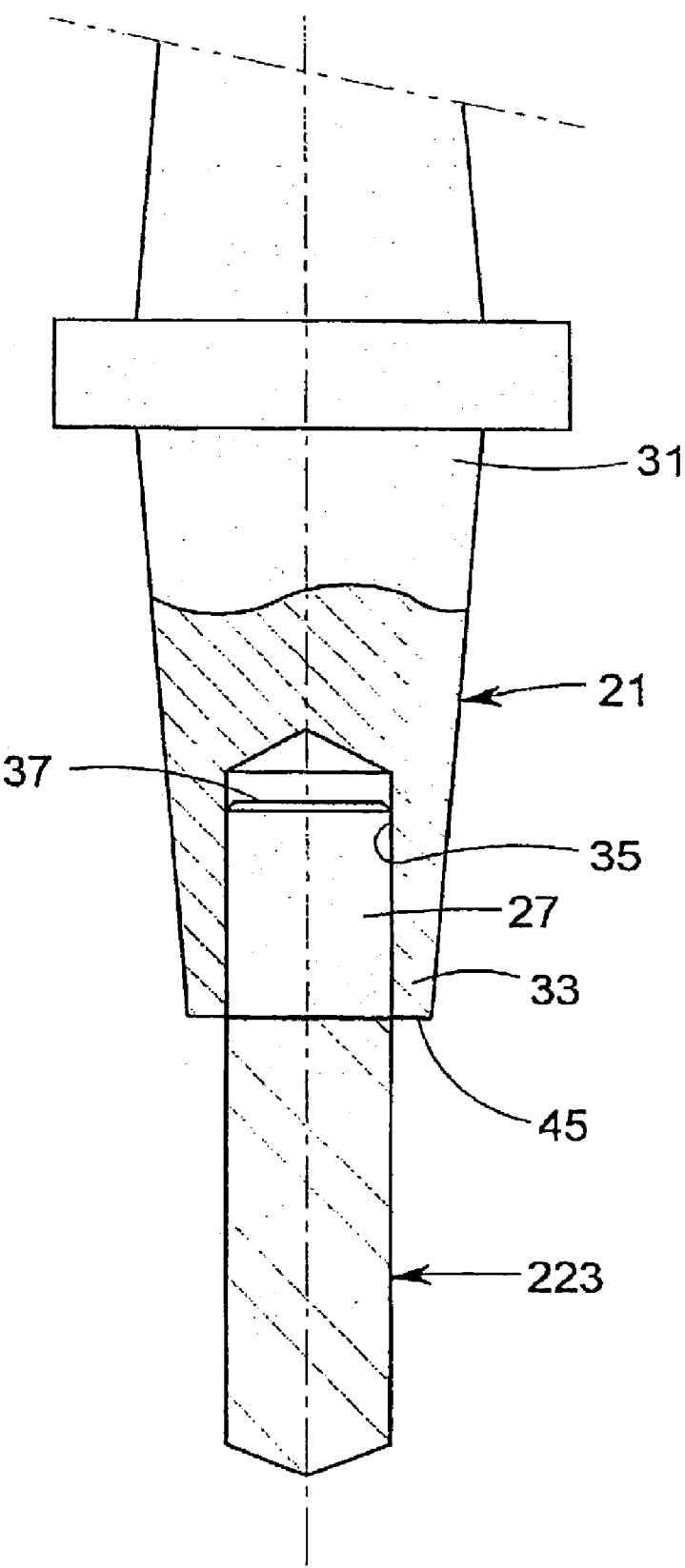
FIG. 15 is a side, cross-sectional view of a toolholder and insert arrangement according to an embodiment of the present invention.

As noted above, the insert 23 preferably includes a shoulder 43 at the base 29 of the cutting portion 25 to assist in locating the insert relative to the toolholder 21. As seen in FIGS. 14 and 15, it may be desirable to provide inserts 123 and 223 that do not have shoulders to abut against the front of the walls of the toolholder 21 by the shank-receiving opening 35. FIG. 14 shows the toolholder 21 used with a grinder 123 and FIG. 15 shows the toolholder used with a straight drill bit or milling insert 223. It will be appreciated that a variety of other tools can be adapted for use in connection with the present invention by providing a shank portion 27 extending from a workpiece contacting portion of the tool.

FIG. 16 shows still a further aspect of the present invention. The toolholder 121 in FIG. 16 is provided with one or more internal channels 101 that are connectable at an outlet 103 to a source of hydraulic fluid, preferably by a manifold arrangement. Portions of the channels 101 surround the shank-receiving opening 35 and, after a shank portion 27 of an insert 23 is positioned in the shank-receiving opening, hydraulic fluid is pressurized in the channels 101 to cause the thinner wall portions of the toolholder between the shank-receiving opening and the channels to deflect inwardly and secure the shank portion. The channels 101 are preferably at least partially defined by a sleeve that defines the shank-receiving opening 35 and is inserted in a larger opening in a main portion of the toolholder, such as is disclosed in U.S. Pat. No. 5,030,048, the disclosure of which is incorporated by reference. If desired, the technique of providing a heated liquid that expands as it solidifies, as disclosed in U.S. Pat. No. 5,030,048, can be followed instead of the technique of providing pressurized hydraulic fluid. The toolholder 121 of FIG. 16 may also be heated, as in the other embodiments of the toolholder disclosed herein, to permit insertion of the shank portion 27 in the shank-receiving opening and so that the combined gripping effect from the hydraulic arrangement shown in FIG. 16 and the contracted material of the toolholder function to grip the shank of the insert.

While this invention has been illustrated and described in accordance with a preferred embodiment, it is recognized that variations and changes may be made therein without departing from the invention as set forth in the claims.

What is claimed is:

1. A toolholder and insert, comprising:
   an insert having a front cutting portion and a rear shank portion at a base of the cutting portion, the insert defining a longitudinal center axis; and
   a toolholder having a rear first end attachable to a spindle and a front second end having a shank-receiving opening;
   wherein, when the shank portion is not disposed in the shank receiving opening and the toolholder is at an ordinary room temperature, the shank-receiving opening is smaller than the shank portion, and upon heating of the toolholder to a predetermined temperature above the ordinary room temperature and above an ordinary operating temperature the shank-receiving opening expands to become at least as large as the shank portion and, upon cooling of the toolholder to a temperature below the predetermined temperature and after insertion of the shank portion in the shank-receiving opening, the shank-receiving opening shrinks to generally conform to a shape of the shank portion;
   wherein there projects rearwardly at a rear end of the shank portion remote from the cutting portion a first integrated engagement portion, and the shank-receiving opening includes a second integrated engagement portion in which the first engagement portion is received, wherein the first and second engagement portions extend generally longitudinally and are arranged to prevent rotation of the insert relative to the toolholder about the axis.

2. The toolholder and insert as set forth in claim 1, wherein an internal diameter of the shank-receiving opening relative to an external diameter of the shank portion is selected such that the internal diameter of the shank-receiving opening is smaller than the external diameter of the shank portion when the toolholder is at the ordinary room temperature and no shank is received in the shank-receiving opening, and the internal diameter of the shank-receiving opening is smaller than the external diameter of the shank portion when the toolholder is at the ordinary operating temperature and no shank portion is disposed in the shank-receiving opening.

3. The toolholder and insert as set forth in claim 1, wherein an internal diameter of the shank-receiving opening when the toolholder is at the ordinary room temperature relative to an external diameter of the shank portion is selected such that, when the shank portion is received in the shank-receiving opening and the shank-receiving opening has shrunk to generally conform to the shape of the shank portion and is at or below the ordinary operating temperature, the toolholder applies sufficient force to the shank to resist ordinary operating torsional forces on the shank.

4. A toolholder and insert, comprising:
   an insert having a cutting portion and a shank portion at a base of the cutting portion; and
   a toolholder having a first end attachable to a spindle and a second end having a shank-receiving opening;
   wherein, when the shank portion is not disposed in the shank receiving opening and the toolholder is at an ordinary room temperature, the shank-receiving opening is smaller than the shank portion, and upon heating of the toolholder to a predetermined temperature above the ordinary room temperature and above an ordinary operating temperature the shank-receiving opening expands to become at least as large as the shank portion and, upon cooling of the toolholder to a temperature below the predetermined temperature and after insertion of the shank portion in the shank-receiving opening, the shank-receiving opening shrinks to generally conform to a shape of the shank portion;
   wherein the cutting portion is larger in diameter than the shank portion and a base of the cutting portion proximate the shank portion includes a radial shoulder;
   wherein an end of the toolholder includes a radial shoulder against which the radial shoulder of the cutting portion abuts, the radial shoulder of the toolholder and the radial shoulder of the cutting portion including interengaging members.

5. The toolholder and insert as set forth in claim 1, wherein the engagement portion includes a half-circle.

6. A toolholder and insert, comprising:

an insert having a cutting portion and a shank portion at a base of the cutting portion; and a toolholder having a first end attachable to a spindle and a second end having a shank-receiving opening;

wherein, when the shank portion is not disposed in the shank receiving opening and the toolholder is at an ordinary room temperature, the shank-receiving opening is smaller than the shank portion, and upon heating of the toolholder to a predetermined temperature above the ordinary room temperature and above an ordinary operating temperature the shank-receiving opening expands to become at least as large as the shank portion and, upon cooling of the toolholder to a temperature below the predetermined temperature and after insertion of the shank portion in the shank-receiving opening, the shank-receiving opening shrinks to generally conform to a shape of the shank portion;

wherein an end of the shank portion remote from the cutting portion and a surface of the toolholder in the shank-receiving opening include mating structures, the mating structures include a pin an a pin receiving opening, the pin being integrated into the shank portion.

7. The tool holder and insert as set forth in claim 1, wherein the engagement portion includes two semicircles.

8. A toolholder and insert, comprising:

an insert having a cutting portion and a shank portion at a base of the cutting portion; and a toolholder having a first end attachable to a spindle and a second end having a shank-receiving opening;

wherein, when the shank portion is not disposed in the shank receiving opening and the toolholder is at an ordinary room temperature, the shank-receiving opening is smaller than the shank portion, and upon heating of the toolholder to a predetermined temperature above the ordinary room temperature and above an ordinary operating temperature the shank-receiving opening expands to become at least as large as the shank portion and, upon cooling of the toolholder to a temperature below the predetermined temperature and after insertion of the shank portion in the shank-receiving opening, the shank-receiving opening shrinks to generally conform to a shape of the shank portion;

wherein an end of the shank portion remote from the cutting portion includes a half-circle shaped engagement portion and the shank-receiving opening includes a corresponding engagement portion in which the engagement portion is received.

9. The toolholder and insert as set forth in claim 1, wherein the first and second engagement portions comprise a pin and a pin receiving opening, respectively.

10. The toolholder and insert as set forth in claim 1, wherein the toolholder includes at least one internal channel, the internal channel includes a portion extending along at least part of a length of the shank-receiving opening and includes an outlet opening connectable to a source of hydraulic fluid.

11. The toolholder and insert as set forth in claim 9, wherein each of the shank portion and the surface of the toolholder in the shank-receiving opening includes a pin receiving opening, the pin being receivable in the pin receiving opening in each of the shank portion and the surface of the toolholder in the shank-receiving opening.

12. The toolholder and insert as set forth in claim 10, wherein the internal channel includes a plurality of portions extending along at least part of a length of the shank-receiving opening and connected by a manifold to the outlet opening.

13. The toolholder and insert as set forth in claim 1, wherein the shank portion has a truncated cone shape, and the shank-receiving opening has a shape corresponding to the shape of the shank portion.

14. The toolholder and insert as set forth in claim 9, wherein the pin and the pin receiving opening are offset from an axis of the shank and the shank-receiving opening.

15. The toolholder and insert as set forth in claim 1, wherein the cutting portion is larger in diameter than the shank portion and a base of the cutting portion proximate the shank portion includes a radial shoulder.

16. The toolholder and insert as set forth in claim 15, wherein an end of the toolholder includes a radial shoulder against which the radial shoulder of the cutting portion abuts.

17. The toolholder and insert as set forth in claim 16, wherein the radial shoulder of the toolholder and the radial shoulder of the culling portion include interengaging members.

18. The toolholder and insert as set forth in claim 17, wherein the interengaging members include at least one ridge and at least one ridge receiving recess.

19. The toolholder and insert as set forth in claim 16, wherein the radial shoulder of the toolholder and the radial shoulder of the culling portion are substantially the same size as each other.

20. The toolholder and insert as set forth in claim 19, wherein the toolholder is substantially circularly cylindrical.

21. The toolholder and insert as set forth in claim 19, wherein the toolholder is shaped like a truncated cone.

22. The toolholder and insert as set forth in claim 1, wherein the shank portion and the shank-receiving opening are substantially circularly cylindrical over at least a portion of a length of the shank portion and the shank-receiving opening.

* * * * *